United States Patent [19]
Byers et al.

[11] 3,808,722
[45] May 7, 1974

[54] PUNCH-OUT FILM MOUNT

[75] Inventors: Donald W. Byers, Portland; Chester H. Petry, Jr.; Carl G. Nordstrom, both of Newberg; James Carl Hensley, Portland, all of Oreg.

[73] Assignee: Byers Photo Equipment Company, Portland, Oreg.

[22] Filed: July 13, 1973

[21] Appl. No.: 378,949

[52] U.S. Cl. ............................................. 40/152
[51] Int. Cl. ............................................. G09f 1/12
[58] Field of Search............. 40/10, 152, 158, 158 B

[56] References Cited
UNITED STATES PATENTS

| | | | |
|---|---|---|---|
| 2,153,221 | 4/1939 | Wittel | 40/152 |
| 2,338,189 | 1/1944 | Libby et al. | 40/152 X |
| 2,686,986 | 8/1954 | Wheeler | 40/158 |
| 3,035,364 | 5/1962 | Hoogesteger | 40/152 |
| 3,200,527 | 8/1965 | Clark | 40/152 |

Primary Examiner—Robert W. Michell
Assistant Examiner—Wenceslao J. Contreras
Attorney, Agent, or Firm—Eugene D. Farley

[57] ABSTRACT

A film mount for mounting film in the production of projectible slides has a central punch-out section incorporating the film, thereby providing a slide assembly having at the election of the operator an enlarged mount dimensioned for use in a projector of a first class, or a mount of reduced dimensions sized for use in a projector of a second class.

10 Claims, 6 Drawing Figures

PATENTED MAY 7 1974 3,808,722
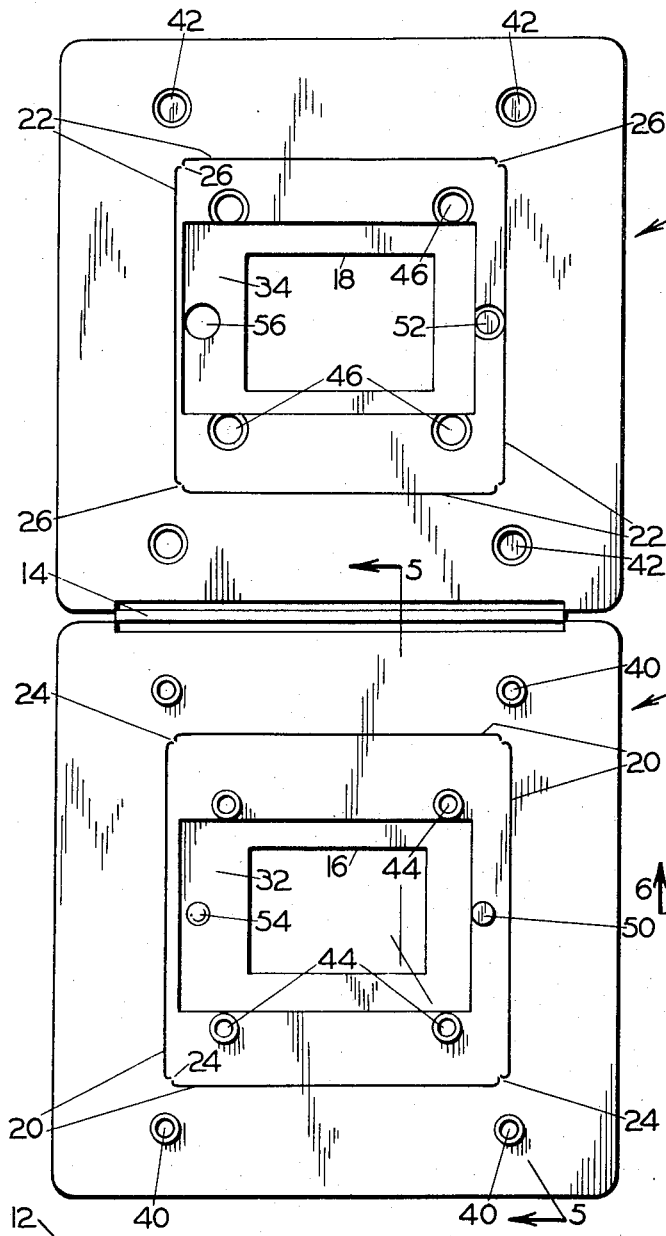
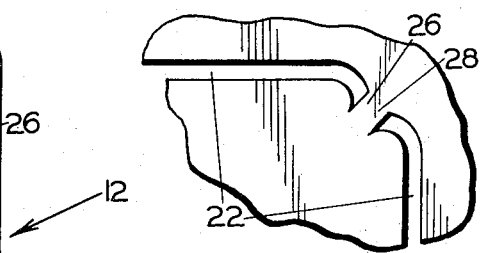
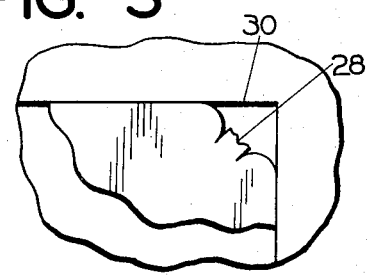
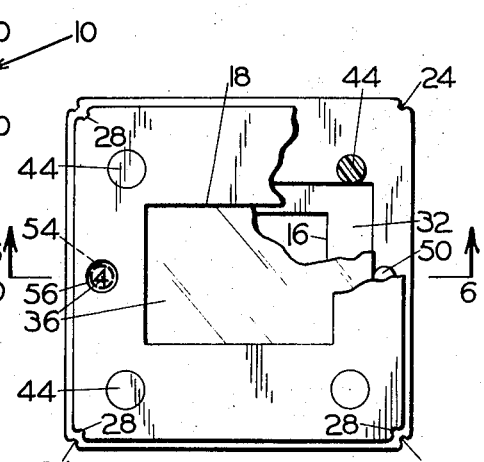
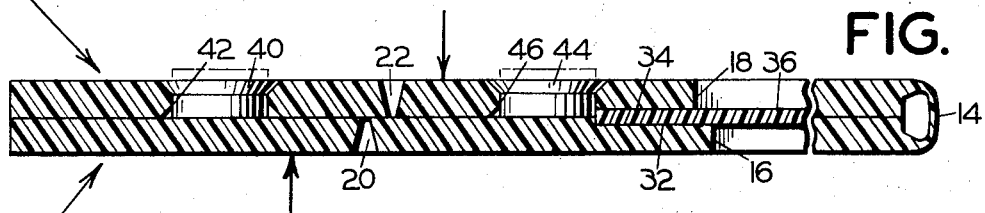
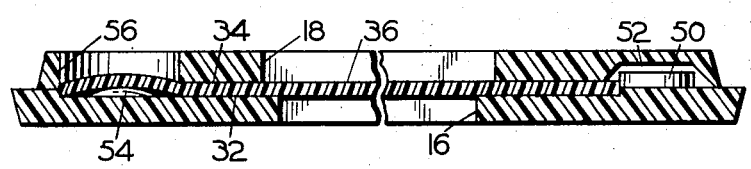

3,808,722

PUNCH-OUT FILM MOUNT

BACKGROUND OF THE INVENTION

In the preparation of photographic slides for use in slide projectors a strip of film containing a number of individual frames is cut into "chips." Each of these comprises a single picture and is mounted separately in a plastic or cardboard mount of size and stiffness suitable for insertion in the feeding mechanism of the slide projector.

In the production sequence, the strip of film is fed progressively to film mounts each comprising two laminae or halves preferably foldably connected to each other and positioned with one-half horizontal and the other folded vertically at 90°. With the mount held by its edges, a single frame of the film strip is positioned on the mount and cut from the balance of the strip. The mount then is reversely folded and the two laminae sealed to each other to form the finished slide. The sequence then is repeated. This all occurs at a high rate of speed, of, for example, 100 frames per minute, in machinery which is automated, complex and costly.

In accomplishing the foregoing sequence, a problem is presented in that although the film size may be constant, different commercially available slide projectors employ mounts of different size. For example, one such projector employs a 2×2" mount for various film sizes. Another, the 110 projector, uses a 30×30 mm. mount for the 110 sized film. Since commercial photofinishers process both types of slides, it is necessary that they duplicate their mounting equipment in order to accommodate both sizes of slides. This obviously increases substantially the required investment for the original purchase of the machines and increases correspondingly the overhead charges for their maintenance.

It accordingly is the general object of the present invention to provide a single film mount which is applicable to both systems and thus requires for the processing of slides of both categories but a single class of film mounting equipment.

Another object of the present invention is the provision of a film mount which in the mounted condition of the film chip may be used per se as a slide of a first size or which, simply by punching out a center section, may be converted to a slide of a second size, thereby being universally applicable to the production of slides of both categories.

Still another object of the present invention is the provision of a film mount for projection-type slides which may be readily converted from a larger size to a smaller size without the production of radially extending projections or "flash," which might interfere with the operation of the slide projectors in which the slides are shown.

Still a further object of the present invention is the provision of a film mount which in the manufacture of projection type slides accurately locates the film chips in the mount, positively secures it in position, provides a window for visual inspection of an identifying number or indicia on the film, and which is well suited for use in high speed, fully automated, film mounting equipment.

SUMMARY OF THE INVENTION

The foregoing and other objects of the invention are accomplished by the provision of a punch-out film mount which in essence comprises two laminae of sheet material preferably foldably hinged to each other, peripherally registrable with each other in the laminar condition, and adapted to mount a film between them.

The laminae have central, substantially registering apertures framing the film. They also have opposite, closed patterns of substantially parallel interrupted perforations separated by tearable connections and defining outer and inner lamina sections of predetermined external dimensions.

Securing means secure the outer and inner laminae face to face so that when they are secured together they provide a first mount having an enlarged external dimension with a punch-out central section which, when separated along the aforesaid pattern of perforations and tearable connections, provides a second mount of a second or smaller external dimension.

Thus the film chips may be mounted uniformly in frames or mounts of a given enlarged size. However, if the slides are to be used in projectors requiring slides of a smaller size, the central portions of the larger slides may be punched out to provide the slides of the desired smaller size.

In the foregoing system, provision is made for guiding the film chips accurately into position in the mounts, locking the chips securely in the finished mounts, and viewing through the mounts identifying numbers or other indicia on the film adjacent the picture.

THE DRAWINGS

FIG. 1 is a plan view of the hereindescribed punch-out film mount of our invention in open position and with the film chip not in place;

FIGS. 2 and 3 are fragmentary detail views illustrating the punch-out section of the mount, before and after separation from the original supporting matrix;

FIG. 4 is a plan view of the punched-out section of the finished slide, partly broken away to reveal inner construction, and FIGS. 5 and 6 are foreshortened sectional views taken along lines 5—5 of FIG. 1 and 6—6 of FIG. 4, respectively.

DETAILED DESCRIPTION OF A SPECIFIC EMBODIMENT

As in the case of conventional film mounts for use in the production of photographic slides for projection purposes, the hereindescribed film mount comprises two laminae indicated generally at 10, 12. The two laminae are foldably hinged to each other by means of a hinge 14. The two laminae are of the same size and are peripherally registrable with each other when folded. In their folded condition, they enclose the film chip and form the finished slide.

The laminae may be fabricated from any suitable structural material, but preferably are fashioned integrally from a sheet of injection molded plastic or cardboard creased to form an integral hinge.

As is also conventional, each of the laminae has a central aperture which frames the film in the final slide. The two apertures are of different size and are indicated at 16, 18, respectively.

In the closed position of the mount, the two apertures are slightly out of registration with each other. When the slide is arranged in the projector so that the smaller aperture is toward the light source, the differential aperture size allows for light deflection and assures that a sharp image, free from shadow, is projected onto the screen.

Each of the laminae has opposite, centrally positioned, closed patterns of interrupted perforations separated by tearable connections. These define inner and outer laminar sections, and also inner and outer sections of the finished mount.

The external dimensions of the outer section are those desired when making slides of a first classification, for example, "2×2" slides. The external dimensions of the inner section are those desired when making slides of the second classification, for example, 30 mm. or "110" slides.

In the illustrated form of the invention, the perforations are present in the form of slits 20 in lamina 10 and slits 22 in lamina 12.

In both cases the slits are arranged in the form of a rectangle of the desired dimensions. In the folded condition of the mount, the two sets of slits do not quite register with each other, FIG. 5. This insures that when the mount is used full size, there will be no light transmission through registering slits during projection of the film.

As is particularly apparent in FIG. 2, the slits 20 have inwardly directed pointed ends 24 and slits 22 have corresponding inwardly directed pointed ends 26. In both cases the pointed ends of adjacent slits are spaced from each other to form tear connections 28.

This arrangement of interrupted slits with inwardly directed ends serves the important function of preventing the production of outwardly directed projections or flash when the inner mount section is punched out of the outer mount section. If such outwardly extending projections were to be present, they would interfere with the operation of the slide insertion subassembly of the projector.

This is particularly clear from FIG. 3, which illustrates the position of the slide in a projector slide holder 30. It is clear from this view that the torn portions of the slide do not project, and in fact are recessed inwardly, where they do not interfere with the operation of the projector mechanism.

The inner laminar sections are provided with rectangular recesses or depressions 32, 34 respectively. In the closed position of the laminae, the two recesses substantially register with each other. Together they form a pocket which receives film chip 36 in the final slide assembly.

Securing means are provided for securing the two laminae together face to face when they are folded with the film chip in position in the central pocket.

If desired, an adhesive may be employed to glue the faces together. Preferably, however, and particularly where the mount is manufactured from an integral sheet of shaped and scored plastic, the securing means comprise a plurality of posts on one lamina and a plurality of registering openings or sockets on the other lamina.

In the illustrated form of the invention, there are accordingly four such posts 40, equally spaced centrally of the outer section of lamina 10. Corresponding openings 42 are provided in the outer section of lamina 12.

Similarly there are a plurality of securing posts 44 extending inwardly from the inner surface of the inner section of lamina 10 and corresponding registering locking openings 46 on the inner section of lamina 12.

Posts 44 and openings 46 are preferably positioned along the margin of the film holding pocket, where they accordingly serve a guiding function and assist in locating the film chip properly in the pocket.

The manner of locking the two laminae together using the post-locking opening combination is conventional and is illustrated in detail in FIG. 5. It will be noted that the posts originally are of a sufficient height so that they extend beyond the plane of the outer surface of the slide. Being of an appropriate plastic material, they may be riveted into receiving openings, thereby securing the two laminae together.

Posts 44 assist in locating film chip 36 in one direction. Means also are present for locating the chip in the other direction.

As is shown particularly in FIG. 6, the inner section of lamina 10 is provided with a post 50 located on the edge of the pocket and extending upwardly a sufficient distance to abut the edge of the film chip. Post 50 is received in a cooperating recess 52 in the margin of inner section of lamina 12.

Locking means are provided for locking the film in proper working position within the mount. The locking means employed for this purpose is illustrated particularly in FIGS. 1 and 6.

A rounded projection or bump 54 extends upwardly from the inner surface of the inner section of lamina 10, diametrically opposite abutment post 50.

A cooperating opening 56 is present in the inner section of lamina 12, diametrically opposite recess 52. In the closed position of the mount, projection 54 pushes the film upwardly into opening 56 with the result that the film is engaged by the edges of the latter, thus locking it in place.

Opening 56 serves a further important function. Where the film bears a frame number on each frame, for example, the numeral "4" of FIG. 4, projection 54 and opening 56 may be located so that the opening registers with the number. The opening thus serves as a view opening, as well as a lock component.

The finished assembly of mount and film thus serves a dual purpose. Not only is the film properly located and secured, but, if desired, the inner segment defined by the slits may be punched out, separated from the outer segment, and used per se. A single slide, produced by a single set of mounting equipment, thus may be employed either full sized as required by certain projecting equipment, or in a diminished size as required by other projecting equipment.

Having thus described our invention in preferred embodiment, we claim:

1. A film mount comprising:
   a. two laminae of sheet material hinged foldably to each other and peripherally registrable with each other in the folded position,
   b. the laminae when folded being adaptable to mount a film between them,
   c. the laminae having central, substantially registering apertures framing the film,
   d. the laminae having opposite closed patterns of substantially aligned, aperture-surrounding, interrupted perforations separated by tearable connections and defining outer and inner lamina sections of predetermined outside dimensions and e. securing means for securing the laminae face to face, f. the laminae when secured together providing a first mount of first external dimensions having a punch-out central section which when separated along the said pattern of perforations and tearable connections provides a second mount of smaller outside dimensions.

2. The film mount of claim 1 wherein the two laminae of sheet material foldably hinged to each other comprise an integral plastic sheet and wherein the securing means comprises rivetable posts on one of the laminae entering registering openings in the other of the laminae.

3. The film mount of claim 1 wherein the two laminae of sheet material foldably hinged to each other comprise an integral plastic sheet, wherein the securing means comprise rivetable posts on one of the laminae entering registering openings on the other of the laminae, and wherein there are rivetable posts on the inner lamina section arranged along the margin of the aperture therein for guiding and retaining a film mounted therein.

4. The film mount of claim 1 including post-and-socket film securing means positioned on the laminae for engaging the film in the folded condition of the mount.

5. The film mount of claim 4 wherein the film contained in the film mount has on the margin thereof an identifying symbol and wherein the socket extends completely through the framing half in which it is contained and constitutes a view window for viewing the symbol.

6. The film mount of claim 1 wherein the closed patterns of interrupted perforations comprise slits defining a rectangle and wherein the slits are separated by tearable connections at the corners of the rectangle.

7. The film mount of claim 6 wherein at the corners the ends of the slits are directed inwardly a distance predetermined to prevent the formation of outwardly projecting flash upon tearing the connections.

8. The film mount of claim 1 wherein the opposite closed patterns of interrupted perforations on the laminae are out of registry with each other by a distance predetermined to prevent light transmission through the slits during projection of the mounted film.

9. A film mount comprising:
a. two laminae of plastic sheet material integrally hinged foldably to each other and peripherably registerable with each other in their folded condition, b. the laminae when folded being adapted to mount a film between them, c. the laminae having central substantially registering apertures framing the film, d. the laminae having opposite closed rectangular patterns of perforations each comprising slits separated at the corners by tearable connections, e. the ends of the slits at the corners being inwardly directed by an amount predetermined to prevent the formation of outwardly projecting flash upon tearing the connections, of the slits defining outer and inner lamina sections of predetermined external dimensions, g. securing means comprising a plurality of rivetable posts on one lamina and a plurality of openings registering with the posts for receiving the same on the other lamina, h. the posts and registering openings being positioned selectively on the outer and inner lamina sections, i. the posts on the inner lamina section being arranged along the margin of the aperture therein for positioning and retaining the film, and j. locking post and registering opening means on the inner lamina sections positioned for locking engagement with the film in the folded position of the laminae.

10. A film mount comprising:
a. two laminae of sheet material peripherally registrable with each other and adapted to mount a film between them, b. the laminae having central, substantially registering apertures framing the film, c. the laminae having opposite closed patterns of substantially aligned, aperture-surrounding, interrupted perforations separated by tearable connections and defining outer and inner lamina sections of predetermined outside dimensions and d. securing means for securing the laminae face to face, e. the laminae when secured together providing a first mount of first external dimensions having a punch-out central section which when separated along the said pattern of perforations and tearable connections provides a second mount of smaller outside dimensions.

* * * * *